US009539550B1

(12) United States Patent
Frankel et al.

(10) Patent No.: US 9,539,550 B1
(45) Date of Patent: Jan. 10, 2017

(54) COARSE BUBBLE DIFFUSER FOR WASTEWATER TREATMENT

(71) Applicants: Thomas E. Frankel, Poughkeepsie, NY (US); Seoungil Kang, Poughkeepsie, NY (US); Todd D. Ritter, Poughkeepsie, NY (US)

(72) Inventors: Thomas E. Frankel, Poughkeepsie, NY (US); Seoungil Kang, Poughkeepsie, NY (US); Todd D. Ritter, Poughkeepsie, NY (US)

(*) Notice: Subject to any disclaimer, the term of this patent is extended or adjusted under 35 U.S.C. 154(b) by 0 days.

(21) Appl. No.: 14/961,121

(22) Filed: Dec. 7, 2015

(51) Int. Cl.
*B01F 3/04* (2006.01)
*C02F 3/20* (2006.01)

(52) U.S. Cl.
CPC .......... *B01F 3/04262* (2013.01); *C02F 3/201* (2013.01); *B01F 2003/04304* (2013.01); *B01F 2003/04361* (2013.01)

(58) Field of Classification Search
CPC .............. B01F 3/04255; B01F 3/04262; B01F 3/04269; B01F 2003/04304; B01F 2003/04361; B01F 2003/04432; C02F 3/201
USPC .......................... 261/121.1, 122.1, 122.2, 124
See application file for complete search history.

(56) References Cited

U.S. PATENT DOCUMENTS

| | | | | |
|---|---|---|---|---|
| 1,939,583 A * | 12/1933 | Welshausen | ......... | A01K 63/003 119/263 |
| 2,590,581 A * | 3/1952 | Shirley | ................ | A01K 63/042 210/167.26 |
| 3,214,151 A * | 10/1965 | Meunier | ............. | B01F 3/04262 137/860 |
| 3,294,380 A * | 12/1966 | Born | ................... | B01F 3/04241 210/220 |
| 3,608,834 A * | 9/1971 | MacLaren | ........... | B01F 3/04255 137/516.17 |
| 3,754,740 A * | 8/1973 | Piper | ................... | B01F 3/04255 239/533.13 |
| 3,953,554 A * | 4/1976 | Loughridge | ........ | B01F 3/04241 261/122.1 |
| 3,997,634 A * | 12/1976 | Downs | .................. | B01F 3/0412 239/533.14 |
| 4,046,845 A * | 9/1977 | Veeder | ................ | B01F 3/04262 239/145 |
| 5,093,047 A * | 3/1992 | Zeppenfeld | ......... | B01F 3/04269 137/859 |
| 6,016,839 A | 1/2000 | Raftis et al. | | |
| 6,193,220 B1 | 2/2001 | Kelly | | |

(Continued)

*Primary Examiner* — Charles Bushey
(74) *Attorney, Agent, or Firm* — Law Offices of Michael L. Wise, LLC

(57) ABSTRACT

An apparatus is presented that includes a body and a membrane. The body defines an externally hemispherical body portion with an orifice, as well as a channel passing through the body and terminating in the orifice. The membrane is formed at least in part of an elastomeric material and overlies a portion of the externally hemispherical body portion. The membrane defines a plurality of holes therein, and a plug that is inserted into the orifice and the channel. When submerged at the bottom of a wastewater treatment tank and in gaseous communication with a distribution conduit providing compressed gas, the apparatus may function to release bubbles into the wastewater. When the compressed gas is turned off, the apparatus acts as a check valve that stops water from entering the diffuser and the distribution conduit.

20 Claims, 4 Drawing Sheets

(56) References Cited

U.S. PATENT DOCUMENTS

| | | |
|---|---|---|
| 6,372,140 B2 | 4/2002 | Kelly |
| 6,702,263 B2 | 3/2004 | Kelly |
| 7,681,867 B2 * | 3/2010 | Hu ................... B01F 3/04269 |
| | | 261/122.1 |
| 8,002,248 B2 * | 8/2011 | Hu ................... B01F 3/04269 |
| | | 261/122.1 |

* cited by examiner

COARSE BUBBLE DIFFUSER FOR WASTEWATER TREATMENT

FIELD OF THE INVENTION

The present invention relates generally to wastewater treatment, and, more particularly, to coarse bubble diffusers for wastewater treatment.

BACKGROUND OF THE INVENTION

Coarse bubble diffusers produce large bubbles, and are designed for use in applications where mixing energy is prioritized over oxygen mass transfer, and where routine maintenance is problematic, as coarse bubble diffusers have traditionally been viewed by the market as being maintenance free, or at least less maintenance intensive than fine bubble diffusers. Applications for these products include primary channels, equalization basins, aerobic digesters, sludge storage tanks, post aeration basins, aeration basins with media requiring scouring or sloughing of biofilm, and some aeration tanks where energy costs may be low or capital is not available to change to fine bubble systems.

In recent years, there has been a trend to cycle diffusers on and off to save power or to provide mixing with less oxygen transfer, for example, to cultivate anoxic bacteria, which prefer to live in an oxygen-poor environment. Batch processes may also require intermittent aeration, as these often fill, aerate, and decant in the same tank in three distinct phases, not all of which use aeration. Greenfield plants have also been built in developing countries with interrupted power supplies, resulting in brownouts, which inadvertently shut off even those systems designed to operate continuously. New methods of sludge dewatering, such as advanced centrifuges, have resulted in higher solids concentrations in aerobic digesters and sludge storage tanks.

Popular coarse bubble diffusers on the market, like the wide band type, have no check valve, so when compressed gas is turned off, the diffuser and the piping system may flood with sludge. If that sludge is thick, or if that sludge remains in the piping system and the diffuser for an extended period of time, it has a tendency to dry out and clog the diffuser and piping system. Rags, sand, grit, and snails are also problems for diffusers that flood when the gas supply is stopped.

Other coarse bubble diffusers like the three-inch and five-inch diameter membrane caps, provide the appearance of having a check valve, but in fact they do not provide a strong check valve function in many applications. In these membrane caps, there is a flap of rubber without holes in it designed to rest over the gas orifice when compressed gas is turned off, but typically the orifice is large, and the slightest latent pressure in the piping system is usually enough to lift a membrane above the orifice where sludge can flow back into the piping system. As this membrane ages, shrinks, or stretches, its resistance to back-flow lessens even more. This diffuser is flat at rest, and is stretched by design in operation. After the system has been at rest for some time the piping system fills with process fluid and sludge. When the compressed gas is turned back on, the membrane acts like a filter, keeping most of the solids in the diffuser and in the pipe, drying them out, and allowing the liquid back out. Initially the piping system when flooded contains mostly liquid and some sludge, but over time the sludge packs itself into the piping, often requiring high pressure hoses to clean it out.

To try to deal with this, a "duckbill" type coarse bubble diffuser has been developed that is called a "check valve" coarse bubble diffuser, and is described in U.S. Pat. No. 6,017,839 to Raftis et al., entitled "Gas Diffuser Valve." However, this type of diffuser can suffer back flow and maldistribution, as it relies on rubber against rubber sealing when the gas is shut off. Rubber is prone to stretching and shrinking over time, particularly in a design which stretches by design as it operates, and as this occurs, a pathway can open up for sludge to enter the diffusers and piping system. Accordingly, for proper performance, these diffusers need to be replaced on a schedule. Failing to do that can result in very high system pressures, as the gas has to overcome the resistance of clogged pipes and diffusers. Furthermore, this type of diffuser, like most diffusers, has a fixed control orifice. This means it is able to distribute gas uniformly only in a tight band of gasflow rates per diffuser. Provide too little gas to the grid and typically only the diffusers closest to the gas supply pipe open up and operate; provide too much gas and the orifice headloss rises exponentially with flow.

SUMMARY OF THE INVENTION

Embodiments of the present invention address the above-identified needs by providing ball-shaped diffusers that provide reliable check-valve functioning without necessitating intensive maintenance.

Aspects of the invention are directed to an apparatus comprising a body and a membrane. The body defines an externally hemispherical body portion with an orifice, as well as a channel passing through the body and terminating in the orifice. The membrane is formed at least in part of an elastomeric material and overlies a portion of the externally hemispherical body portion. The membrane defines a plurality of holes therein, and a plug that is inserted into the orifice and the channel.

Additional aspects of the invention are directed to a system comprising a distribution conduit, a body, and a membrane. The body defines an externally hemispherical body portion with an orifice, as well as a channel passing through the body and terminating in the orifice. The channel is in gaseous communication with an interior of the distribution conduit. The membrane is formed at least in part of an elastomeric material and overlies a portion of the externally hemispherical body portion. The membrane defines a plurality of holes therein, and a plug that is inserted into the orifice and the channel.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

Figure 1:
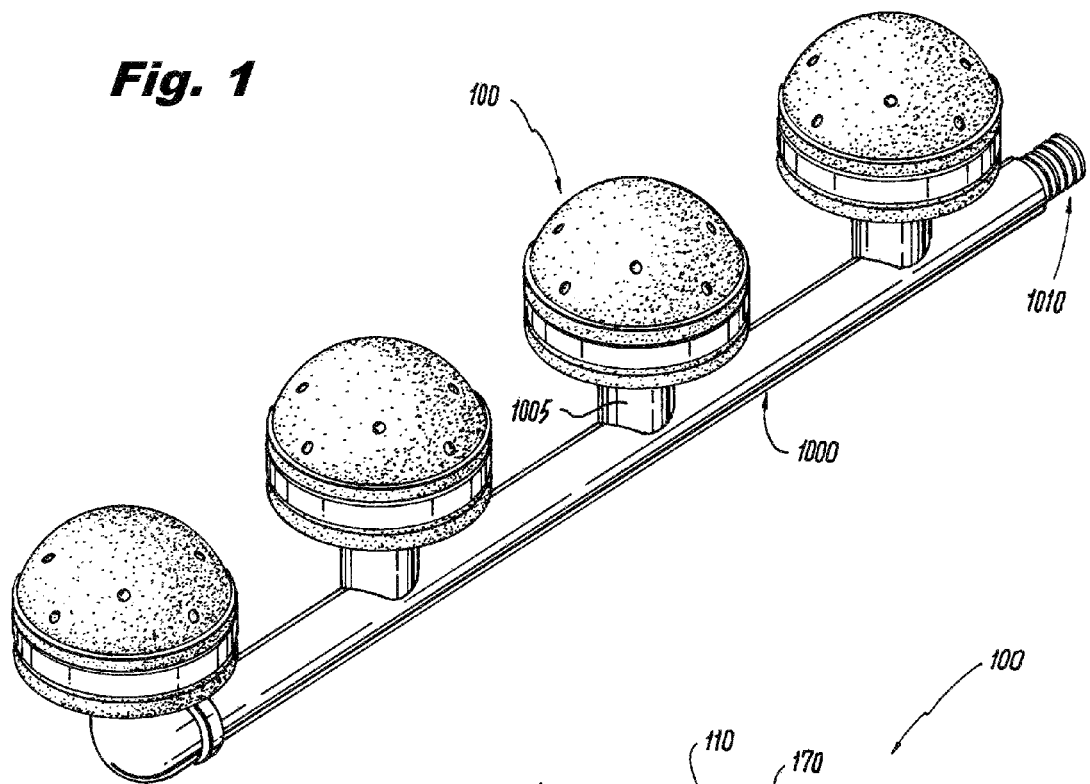
FIG. 1 shows a perspective view of diffusers in accordance with an illustrative embodiment of the invention mounted on a distribution conduit.

FIG. 1 shows a perspective view of four diffusers 100 in accordance with an illustrative embodiment of the invention mounted on a distribution conduit 1000. The four diffusers 100 and the distribution conduit 1000 may be placed at the bottom of a wastewater treatment tank. Compressed gas may then be supplied to the diffusers 100 via the distribution conduit 1000 so as to cause each of the diffusers 100 to release bubbles into the surrounding wastewater. The bubbles serve both to aerate the wastewater as well as to mix the wastewater.

Figure 2:
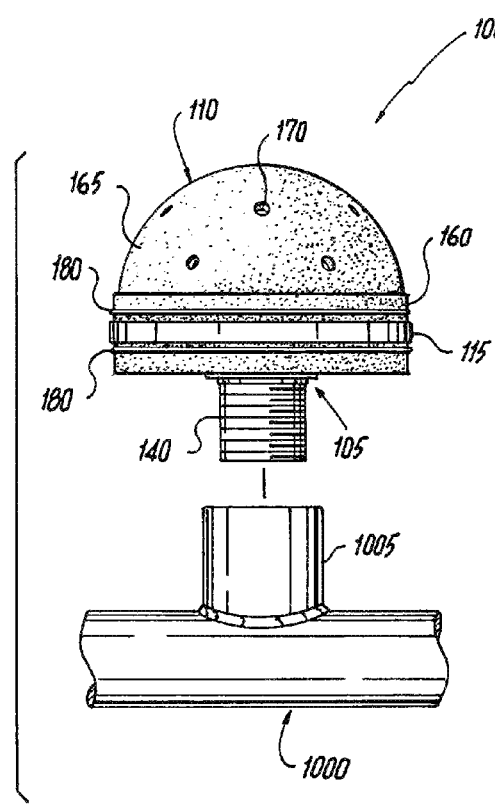
FIG. 2 shows an exploded side elevational view of a representative one of the FIG. 1 diffusers and a portion of the FIG. 1 distribution conduit.
Figure 3:
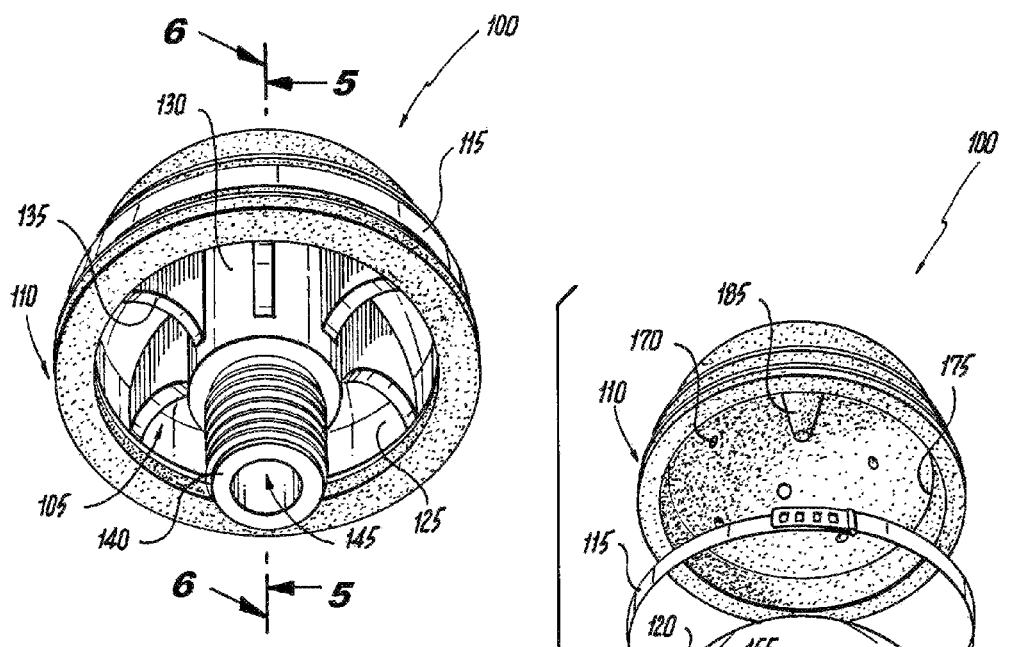
FIG. 3 shows a bottom perspective view of the FIG. 2 diffuser.
Figure 4:
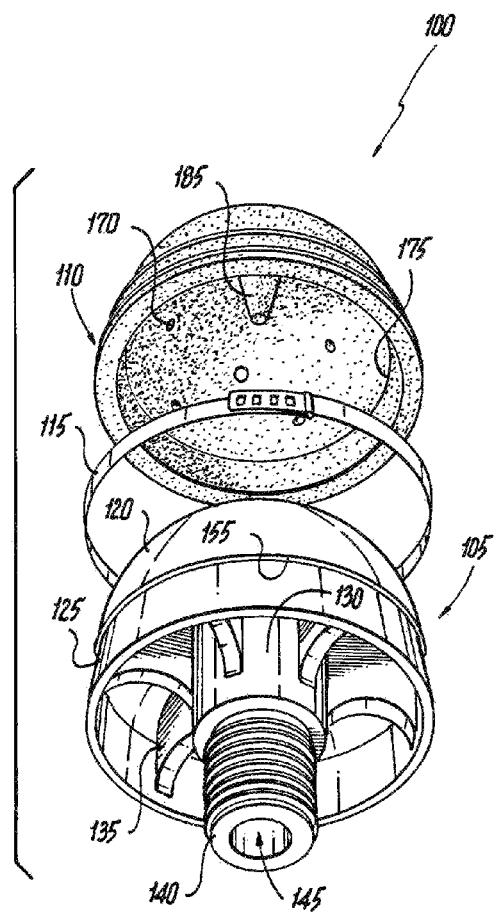
FIG. 4 shows an exploded bottom perspective view of the FIG. 2 diffuser.
Figure 5:
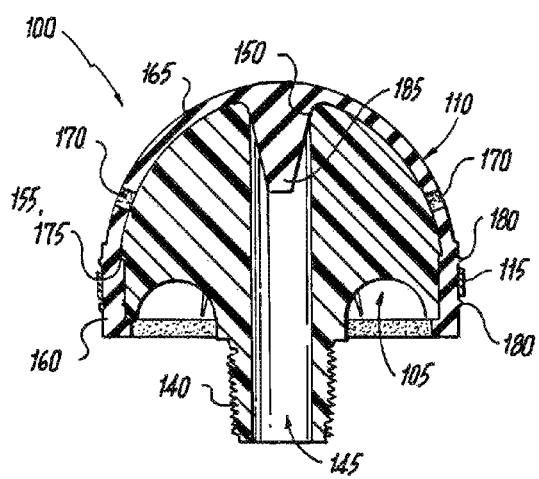
FIG. 5 shows a first sectional view of the FIG. 2 diffuser along the plane indicated in FIG. 3.
Figure 6:
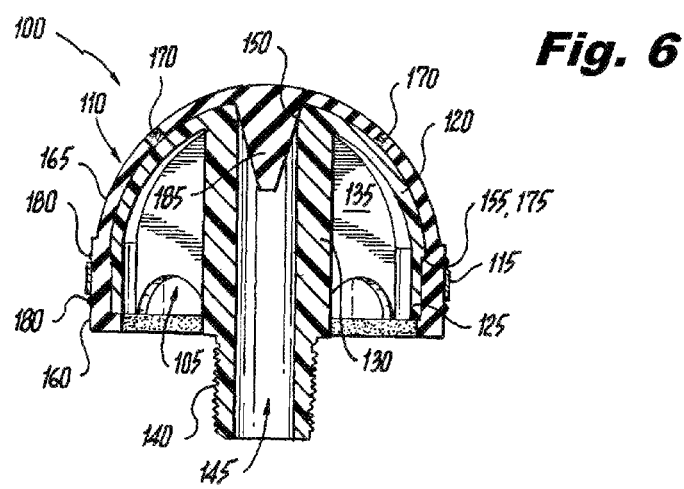
FIG. 6 shows a second sectional view of the FIG. 2 diffuser along the plane indicated in FIG. 3.

Additional details of a representative one of the diffusers 100 are shown in FIGS. 2-6. FIG. 2 shows an exploded side elevational view of the diffuser 100 and a portion of the distribution conduit 1000, while FIGS. 3 and 4 show intact and exploded bottom perspective views, respectively, of the diffuser 100. Finally, FIGS. 5 and 6 show first and second sectional views, respectively, of the diffuser 100 along the planes indicated in FIG. 3.

The diffuser 100 may be separated into a body 105, a membrane 110, and a circular clamp 115. The body 105 defines: an externally hemispherical body portion 120, an externally cylindrical body portion 125, an internal hollow cylindrical body portion 130, several internal structural fins 135, and a threaded hollow cylindrical stem 140. The threaded hollow cylindrical stem 140 combines with the internal hollow cylindrical body portion 130 to form a straight-walled cylindrical channel 145 that terminates in a round orifice 150 disposed at a crown of the externally hemispherical body portion 120. At the same time, the externally cylindrical body portion 125 abuts a base of the externally hemispherical body portion 120. The diameter of the externally cylindrical body portion 125 is smaller than a diameter of a base of the externally hemispherical body portion 120 so that a circular edge 155 is formed at the base of the externally hemispherical body portion 120. The several internal structural fins 135 span between the internal hollow cylindrical body portion 130 and the externally hemispherical body portion 120 to give the body 105 structural integrity.

The membrane 110 has a shape that mimics somewhat the external shape of the body 105. That is, the membrane 110 defines a cylindrical membrane part 160 that is attached to a base of a hemispherical membrane part 165. The hemispherical membrane part 165 defines a plurality of holes 170 therein. When the diffuser 100 is assembled, the hemispherical membrane part 165 overlies the externally hemispherical body portion 120, while the cylindrical membrane part 160 overlies the externally cylindrical body portion 125. An internal circular shoulder 175 at the interface of the cylindrical membrane part 160 and the hemispherical membrane part 165 abuts the circular edge 155 of the body 105 to reduce the chance of the membrane 110 lifting away from the body 105. Externally, the cylindrical membrane part 160 defines a pair of parallel circular external ridges 180.

The membrane further defines a conical plug 185, which projects internally from the crown of the hemispherical membrane part 165. In accordance with aspects of the invention, the conical plug 185 is inserted into the round orifice 150 and the cylindrical channel 145 of the body 105. With the conical plug 185 fully inserted into the round orifice 150 and the cylindrical channel 145 as shown in FIGS. 5 and 6, a watertight seal is formed at the top of the cylindrical channel 145 between the membrane 110 and the body 105.

The circular clamp 115 encircles the cylindrical membrane part 160 and the externally cylindrical body portion 125 so as to compressively fixate the membrane 110 to the body 105. The circular clamp 115 falls between the pair of parallel circular ridges 180 so that the chance of the membrane 110 translating up or down in the circular clamp 115 is reduced.

In one or more embodiments, the body 105 may be made of a hard plastic such as, for example, acetal, while the membrane 110 may be formed of an elastomeric material such as, as just two examples, silicone rubber or ethylene propylene diene monomer (EPDM) rubber. The membrane 110 may further be coated with polytetrafluoroethylene (PTFE) or impregnated with fluorine. Manufacture of both the body 105 and the membrane 110 may be by injection molding. The circular clamp 115 may comprise a conventional metallic hose clamp that may be sourced commercially.

Figure 7:
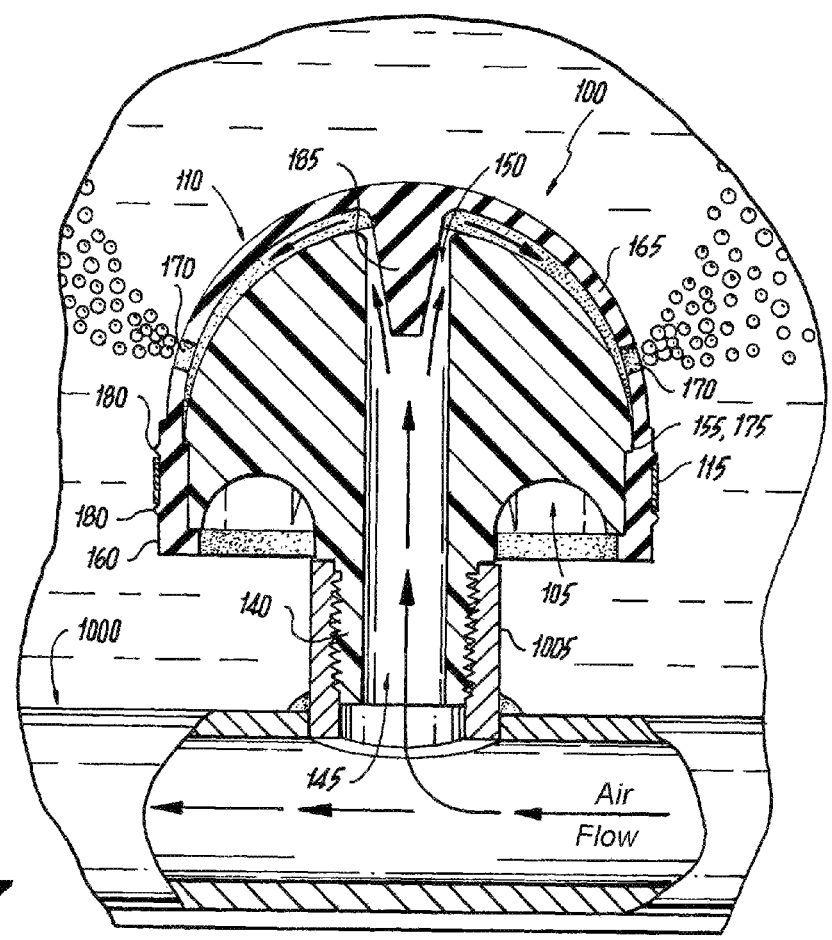
FIG. 7 shows a sectional view of the FIG. 2 diffuser and portion of distribution conduit with gas being supplied to the diffuser.

FIG. 7 shows a sectional view of the representative diffuser 100 and a portion of the distribution conduit 1000 with compressed gas being supplied to the diffuser 100. This figure helps to illustrate how the two are mated together and function while submerged at the bottom of a wastewater treatment tank.

In the present illustrative embodiment, the diffuser 100 is mounted to the distribution conduit 1000 via the threaded hollow cylindrical stem 140, which is threaded into an internally threaded neck 1005 that protrudes upward from the remainder of the distribution conduit 1000.

Once so fixated, the cylindrical channel 145 of the body 105 is in gaseous communication with the interior of the distribution conduit 1000. The provisioning of compressed gas into the distribution conduit 1000 therefore forces gas into the cylindrical channel 145 of the body 105 towards the round orifice 150 (upward directed arrows in FIG. 7). The compressed gas presses against the conical plug 185 and the inside of the hemispherical membrane part 165, and acts to stretch the membrane 110 upward away from the body 105. That is, a portion of the membrane 110 is operative to expand away from the body 105 in response to the passing of gas through the cylindrical channel 145 and the round orifice 150. The compressed gas travels in a newly-created region between the membrane 110 and the body 105 and eventually reaches the holes 170 in the membrane 110, where it is expelled as bubbles into the surrounding wastewater. When the compressed gas is subsequently turned off, the membrane 110 returns back to its relaxed state, as shown in FIGS. 2-6, both in response to the natural tendency of an elastomer to relax after being stretched, as well as in response to the pressure exerted on the membrane 110 by the surrounding wastewater.

Returning to FIG. 7, it will be noted that the extent of insertion of the conical plug 185 into the round orifice 150 and the cylindrical channel 145 decreases when the membrane 110 expands away from the body 105 in response to the supplied compressed gas. That is, when compressed gas is supplied to the diffuser 100, the conical plug 185 lifts somewhat out of the round orifice 150 and the cylindrical channel 145, although the conical plug 185 does not lift out of these elements completely (i.e., some portion of the conical plug 185 remains inserted into the round orifice 150 and the cylindrical channel 145). In contrast, when the compressed gas is turned off, the conical plug 185 reseats fully in the round orifice 150 and the cylindrical channel 145, and the watertight seal set forth above is re-established. The unique combination of the conical plug 185, the round orifice 150, and the cylindrical channel 145 thereby forms a check valve that allows gas to flow in one direction when compressed gas is turned on, and stops water from flowing in the other direction when the gas is turned off. With the compressed gas turned off, the weight of the wastewater on the membrane 110 maintains the tight watertight seal at the round orifice 150. The membrane 110 with its hemispherical shape presents a greater surface area to the surrounding wastewater than would an equivalent flat membrane. Accordingly, the pressure of the surrounding wastewater on the membrane 110 is higher than would be the case on a flat membrane, enhancing the sealing capability of the membrane 110 against the body 105 and the round orifice 150.

As indicated above, it is preferred that the conical plug 185 be of sufficient length that it does not completely exit the round orifice 150 and the cylindrical channel 145 when the diffuser is in operation, that is, with the diffuser 100 producing bubbles and the membrane 110 expanded somewhat away from the body 105 (FIG. 7). Having some portion of the conical plug 185 remain in the round orifice 150 and the cylindrical channel 145 while the diffuser 100 is in operation allows the conical plug 185 to guide itself back into a fully seated position (FIGS. 5 and 6) when the compressed gas is ultimately turned off and the membrane 110 relaxes.

Figure 8:
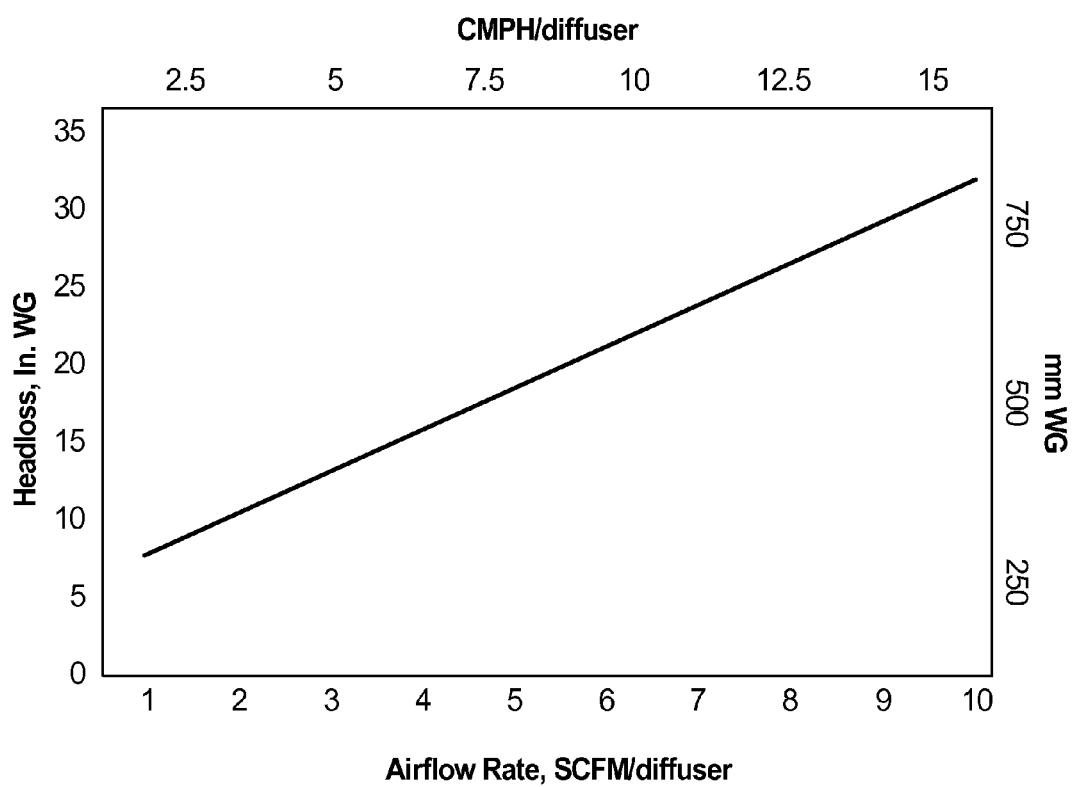
FIG. 8 shows a graph of headloss versus airflow rate for prototypes of the FIG. 2 diffuser.

Prototypes of the above-described diffuser 100 were manufactured, and the submerged prototypes were observed to create plumes of bubbles when supplied with compressed gas. Headloss versus gas flow was also measured. Headloss essentially measures the loss in energy in the gas as it passes through the diffuser. The results of these measurements are shown in FIG. 8, where headloss is shown in inches-water-gauge (in. WG) and millimeters-water-gauge (mm WG), and flow is shown in standard cubic feet per minute per diffuser (SCFM/diffuser) and cubic meters per hour per diffuser (CMPH/diffuser). Notably, headloss was measured as being linear with gas flow across a wide range of gas flows. This suggest that the gap between the conical member and the round orifice increases in area as the gasflow to the diffuser rises, so the orifice headloss is responsive to gasflow and modulates itself. When the compressed gas was turned off, the prototypes sealed themselves off to water encroachment into their orifices.

The diffuser 100, and more generally, diffusers falling within the scope of the invention, present several advantages. For example, with the diffuser 100 configured as set forth above, attaching the membrane 110 to the body 105 is as simple as applying the membrane 110 to the body 105 as indicated in FIGS. 1-6, and then tightening the circular clamp 115 about both elements. Once so attached, the combination of the circular edge 155 and the internal circular shoulder 175 assure that the membrane 110 does not slip on the body 105. At the same time, the pair of parallel circular ridges 180 assures that the membrane 110 does not slide underneath the circular clamp 115.

Installation of the diffuser 100 onto the distribution conduit 1000 and its subsequent removal are also very easy, and may therefore be performed by largely unskilled labor. Installation of the diffuser 100, for example, is as easy as screwing the threaded hollow cylindrical stem 140 into the internally threaded neck 1005 of the distribution conduit 1000. Removal is performed by simply unscrewing these components.

At the same time, the distribution conduit 1000 provides an opportunity to retrofit existing wide band coarse bubble diffusers with diffusers similar to the diffusers 100. Wide band coarse bubble diffusers frequently include male threaded portions (i.e. nipples) that allow these diffusers to be threaded into gas distribution pipes with corresponding female threaded receivers. Returning to FIG. 1, the distribution conduit 1000 defines male threads 1010. These male threads 1010 may be sized to match the diameter of the male threads on existing wide band coarse bubble diffusers. To replace a wide band coarse bubble diffuser, that diffuser may simply be unscrewed from its gas distribution pipe and the distribution conduit 1000 threaded into its place. In so doing, a wide band coarse bubble diffuser may be replaced by the distribution conduit 1000 and several diffusers 100, as shown in FIG. 1, giving the aeration system the check valve capabilities and other advantages set forth herein. No modifications need to be made to the existing wide band piping grids, which are typically formed of stainless steel and are therefore expensive to replace or modify.

Perhaps, most importantly, the diffuser 100 and diffusers in accordance with aspects of the invention provide the desired check valve function in a reliable manner and with little maintenance. That is, the diffuser 100 allows gas to pass in one direction when turned on, but reliably prevents water from entering the diffuser 100 and the distribution conduit 1000 when turned off. A wastewater treatment plant may therefore turn their systems on and off at will without suffering degradation associated with fluid and sludge entering the piping. Wastewater system performance is thereby maintained while maintenance requirements are reduced. The variable-sized orifice produced by the unique interaction of the conical plug 185, the round orifice 150, and the cylindrical channel 145 allow a uniform air distribution across a piping grid over a wide range of air flows.

It should again be emphasized that the above-described embodiments of the invention are intended to be illustrative only. Other embodiments can use different types and arrangements of elements for implementing the described functionality. For example, while the illustrative body 105 set forth above is shown to include certain internal elements (e.g., the internal hollow cylindrical body portion 130 and the internal structural fins 135), alternative bodies falling within the scope of the invention may be arranged in a different manner. A body may, for example, be essentially solid with a cylindrical channel passing therethrough. These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. §112(f). In particular, the use of "step of" in the claims herein is not intended to invoke the provisions of AIA 35 U.S.C. §112(f).

What is claimed is:

1. An apparatus comprising:
a body defining:
an externally hemispherical body portion with an orifice;
a channel passing through the body and terminating in the orifice; and
a membrane formed at least in part from an elastomeric material, overlying at least a portion of the externally hemispherical body portion, and defining:
a plurality of holes therein; and
a plug inserted into the orifice and the channel.

2. The apparatus of claim 1, wherein the orifice is disposed at a crown of the externally hemispherical body portion.

3. The apparatus of claim 1, wherein the body further defines a hollow cylindrical stem that surrounds a portion of the channel and is at least partially externally threaded.

4. The apparatus of claim 3, wherein the channel passes linearly from an end of the hollow cylindrical stem to the orifice.

5. The apparatus of claim 1, wherein the channel is cylindrical.

6. The apparatus of claim 1, wherein the orifice is round.

7. The apparatus of claim 1, wherein the body further defines an externally cylindrical body portion that abuts a base of the externally hemispherical body portion.

8. The apparatus of claim 7, wherein the externally cylindrical body portion is characterized by a diameter smaller than a diameter of a base of the externally hemispherical body portion so that a circular edge is formed at the base of the externally hemispherical body portion.

9. The apparatus of claim 7, wherein the membrane further defines a cylindrical membrane part that at least partially overlies the externally cylindrical body portion.

10. The apparatus of claim 9, wherein the cylindrical membrane part defines a pair of parallel circular external ridges.

11. The apparatus of claim 1, wherein the plug is at least partially conical.

12. The apparatus of claim 1, further comprising a circular clamp encircling the membrane and the body.

13. The apparatus of claim 12, wherein the circular clamp is operative to fixate the membrane to the body.

14. The apparatus of claim 1, wherein the membrane is operative to expand away from the body in response to passing of compressed gas through the channel towards the orifice.

15. The apparatus of claim 14, wherein an extent of insertion of the plug into the orifice and the channel decreases when the membrane expands away from the body.

16. The apparatus of claim 14, wherein, without the membrane expanded away from the body, the plug is inserted into the orifice and the channel so as to form a watertight seal between the membrane and the body.

17. A system comprising:
a distribution conduit;
a body attached to the distribution conduit and defining:
an externally hemispherical body portion with an orifice;
a channel passing through the body and terminating in the orifice, and in gaseous communication with an interior of the distribution conduit; and
a membrane formed at least in part from an elastomeric material, overlying at least a portion of the externally hemispherical body portion, and defining:
a plurality of holes therein; and
a plug inserted into the orifice and the channel.

18. The system of claim 17, wherein:
the distribution conduit, the body, and the membrane are submerged in a liquid; and
the system is operative to release bubbles into the liquid through the plurality of holes via a provisioning of gas to the channel through the distribution conduit.

19. The system of claim 17, wherein the distribution conduit defines a set of male threads.

20. The system of claim 17, wherein the body is threaded into the distribution conduit.

* * * * *